(12) United States Patent
McCoy

(10) Patent No.: US 7,590,184 B2
(45) Date of Patent: Sep. 15, 2009

(54) BLIND PREAMBLE DETECTION FOR AN ORTHOGONAL FREQUENCY DIVISION MULTIPLEXED SAMPLE STREAM

(75) Inventor: James W. McCoy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 605 days.

(21) Appl. No.: 11/247,481

(22) Filed: Oct. 11, 2005

(65) Prior Publication Data

US 2007/0081601 A1    Apr. 12, 2007

(51) Int. Cl.
*H04K 1/10* (2006.01)
(52) U.S. Cl. .................. 375/260; 375/354; 375/355; 375/368; 375/369; 375/316
(58) Field of Classification Search .............. 375/260, 375/147–150, 316, 340–343, 347, 354–355, 375/136–137, 364–369
See application file for complete search history.

(56) References Cited

U.S. PATENT DOCUMENTS

| | | | |
|---|---|---|---|
| 5,463,716 | A | 10/1995 | Taguchi |
| 6,650,616 | B2 | 11/2003 | Crawford |
| 7,136,432 | B2 | 11/2006 | Min et al. |
| 7,206,350 | B2 | 4/2007 | Korobkov et al. |
| 7,280,621 | B1 * | 10/2007 | Murphy .................. 375/340 |
| 2003/0012302 | A1 | 1/2003 | Webster et al. |
| 2003/0067999 | A1 * | 4/2003 | Echavarri et al. .......... 375/343 |
| 2003/0112743 | A1 * | 6/2003 | You et al. ................ 370/203 |
| 2004/0052319 | A1 | 3/2004 | Wakamatsu |
| 2005/0008067 | A1 | 1/2005 | Lewis |
| 2005/0008088 | A1 * | 1/2005 | Liu et al. ................ 375/260 |
| 2005/0063298 | A1 | 3/2005 | Ling et al. |
| 2005/0105647 | A1 | 5/2005 | Wilhelmsson et al. |
| 2005/0125176 | A1 | 6/2005 | Makhlouf |
| 2005/0152326 | A1 | 7/2005 | Vijayan et al. |
| 2005/0169408 | A1 | 8/2005 | Kim |
| 2006/0171493 | A1 | 8/2006 | Kim et al. |
| 2006/0239367 | A1 | 10/2006 | Wilhelmsson et al. |
| 2007/0019538 | A1 | 1/2007 | Long et al. |
| 2007/0066362 | A1 | 3/2007 | Ma et al. |
| 2007/0110174 | A1 | 5/2007 | Glazko et al. |

OTHER PUBLICATIONS

"Convolution and Correlation",document Jul. 1999.*
"Lecture 6" document, Oct. 1999.*
International Search Report for Correlating PCT Patent Application No. PCT/US06/39648 dated Mar. 21, 2008.

* cited by examiner

*Primary Examiner*—Mohammad H Ghayour
*Assistant Examiner*—Sophia Vlahos
(74) *Attorney, Agent, or Firm*—Dillon & Yudell LLP

(57) ABSTRACT

A method for determining a presence of a preamble for an orthogonal frequency division multiplexed (OFDM) complex valued sample stream may include capturing a portion of the OFDM complex valued stream and autoconvolving the portion of the OFDM complex valued sample stream to generate an autoconvolved portion. The method may further include determining a presence of a preamble in the OFDM complex valued sample stream if a peak is detected in the autoconvolved portion.

20 Claims, 4 Drawing Sheets

BLIND PREAMBLE DETECTION FOR AN ORTHOGONAL FREQUENCY DIVISION MULTIPLEXED SAMPLE STREAM

FIELD OF THE INVENTION

The present invention relates generally to communication methods and systems, and more particularly to blind preamble detection for an orthogonal frequency division multiplexed sample stream.

RELATED ART

Traditionally, in an OFDM receiver, preamble detection for a complex valued sample stream has been performed by using supervised techniques. Such supervised techniques require the knowledge of the pattern of the complex valued sample stream. Accordingly, these techniques do not work in an environment where there may be a large number of possible patterns of the complex valued sample stream. This is because it becomes computationally difficult to process the large number of possible patterns of the complex valued sample stream.

Thus, there is a need for methods and systems for preamble detection in a complex valued sample stream, which are blind and thus do not require the processing of large number of patterns of the complex valued sample stream.

BRIEF DESCRIPTION OF THE DRAWINGS

The present invention is illustrated by way of example and not limited by the accompanying figures, in which like references indicate similar elements, and in which.

Figure 1:
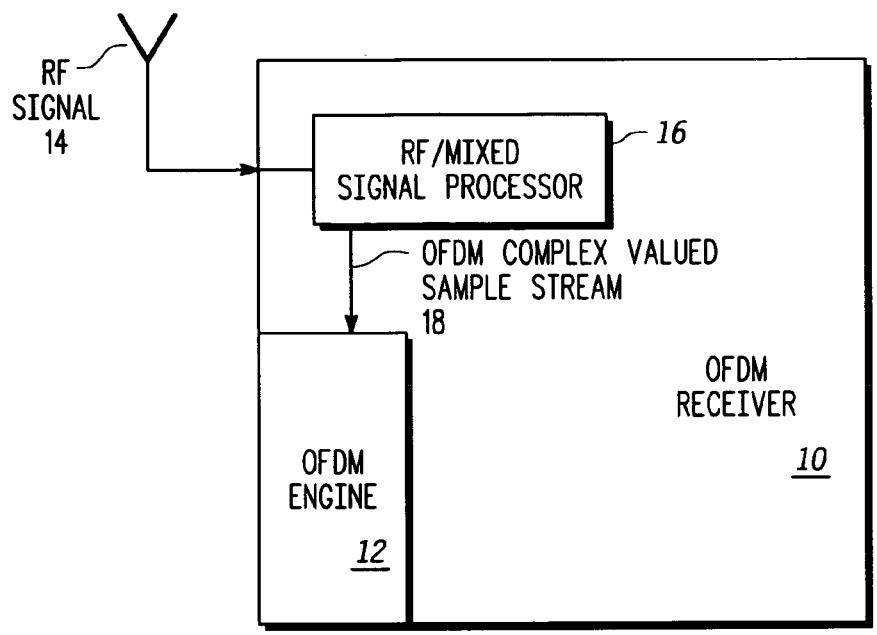
FIG. 1 is a block diagram of an exemplary OFDM receiver, consistent with one embodiment of the invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE EMBODIMENTS

In one aspect, a method for determining a presence of a preamble for an orthogonal frequency division multiplexed (OFDM) complex valued sample stream is provided. The exemplary method may include capturing a portion of the OFDM complex valued stream and autoconvolving the portion of the OFDM complex valued sample stream to generate an autoconvolved portion. The method may further include determining a presence of a preamble in the OFDM complex valued sample stream if a peak is detected in the autoconvolved portion.

In another aspect, a method for generating a coarse timing for an orthogonal frequency division multiplexed (OFDM) complex valued sample stream is provided. The method may include capturing a portion of the OFDM complex valued sample stream and autoconvolving the portion of the OFDM complex valued sample stream to generate an autoconvolved portion. The method may further include determining a presence of a preamble in the OFDM complex valued sample stream, if a peak is detected in the autoconvolved portion. The method may further include, if the presence of the preamble is determined, selecting one of a plurality of peaks in the autoconvolved portion having greatest energy among the plurality of peaks. The method may further include identifying at least three time instants relative to the selected one of the plurality of peaks and autoconvolving at least three identical size portions of the OFDM complex valued sample stream beginning at each of the at least three time instants. The method may further include selecting a time instant out of the at least three time instants that is earliest in time and has a peak in the autoconvolved identical size portion. The method may further include identifying at least three refined time instants located at predetermined displacements in time from the selected time instant. The method may further include, for each one of the at least three refined time instants, measuring autocorrelation between two portions of the OFDM complex valued sample stream. The method may further include selecting one of the at least three refined time instants having lowest phase variance of the autocorrelation as an end of a cyclic prefix of a preamble.

In yet another aspect, an orthogonal frequency division multiplexing (OFDM) receiver comprising an OFDM engine, wherein the OFDM engine may be configured to capture a portion of an OFDM complex valued sample stream, is provided. The OFDM receiver may further be configured to autoconvolve the portion of the OFDM complex valued sample stream to generate an autoconvolved portion. The OFDM receiver may further be configured to determine a presence of a preamble in the OFDM complex valued sample stream, if a peak is detected in the autoconvolved portion.

FIG. 1 is an exemplary block diagram of an OFDM receiver 10, consistent with one embodiment of the invention. OFDM receiver 10 may include, among other components, an OFDM engine 12 and a RF/mixed signal processor 16. By way of example, RF/mixed signal processor 16 may receive a RF signal 14 via an antenna. RF/mixed signal processor 16 may generate an OFDM complex valued sample stream 18. OFDM engine 12 may capture the OFDM complex valued sample stream 18 and process it further in accordance with the embodiments of the invention. OFDM receiver 10 may be implemented using any combination of hardware, software, and/or firmware. Although FIG. 1 shows only an OFDM engine 12 and a RF/mixed signal processor 16 as part of OFDM receiver 10, the OFDM receiver may include additional or fewer components.

Figure 2:
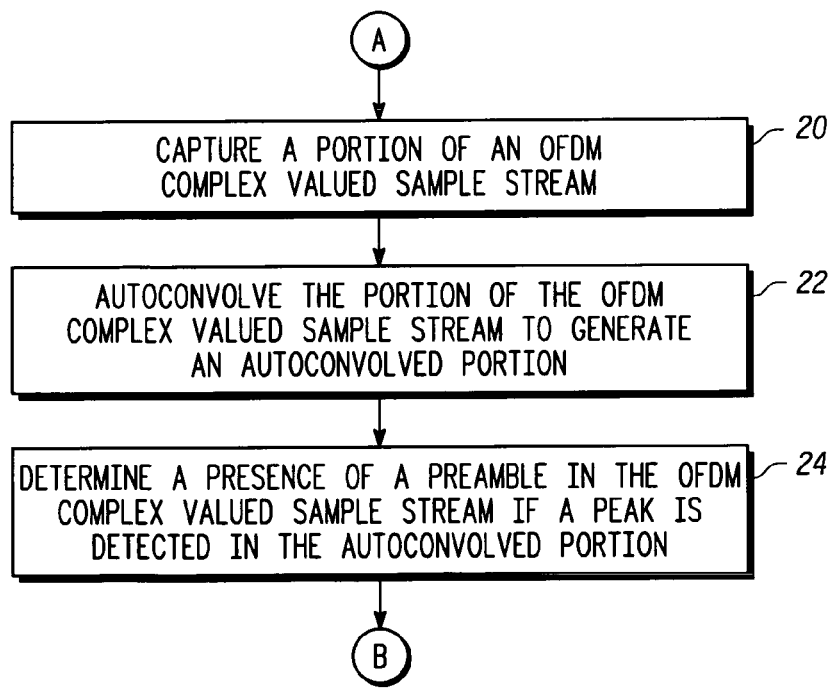
FIG. 2 is a flow chart for an exemplary method for determining the presence of a preamble in an OFDM complex valued sample stream, consistent with one embodiment of the invention.

FIG. 2 is a flow chart for an exemplary method for determining the presence of a preamble in an OFDM sample stream, consistent with one embodiment of the invention. As used herein, the term "preamble" is not limited to the header or the beginning part of an OFDM frame, instead it covers similar structures that may be in the middle, end, or any other part of the OFDM frame. Thus, preamble, as used herein may cover structures referred to as mid-amble or post-amble. As part of the exemplary method, OFDM engine 12 may capture a portion of an OFDM complex valued sample stream (step 20). As part of this step, OFDM engine 12 (FIG. 1) may store samples corresponding to the portion of the OFDM complex valued sample stream in one or more buffers.

Next, OFDM engine 12 may autoconvolve the portion of the OFDM complex valued sample stream to generate an autoconvolved portion (step 22). Autoconvolving, as used herein, means that the portion of the OFDM complex valued sample stream is convolved with itself. Thus, for example using the exemplary equation below an autoconvolved portion of the complex valued sample stream may be generated.

$$\text{Autoconvolved portion} = \sum_{i=1429n}^{1429n+682} S_W(i) S_W(\text{mod}((k-i), 1024))$$

where, $S_W$ is the portion of the OFDM complex valued sample stream;

i is the index of the portion of the OFDM complex valued sample stream;

n indexes the autoconvolved portions (thus n would increment for each autoconvolution performed); and k is the index of the autoconvolved portion (thus k would increment for every sample in the resulting autoconvolved portion).

Although the above equation relates to circular autoconvolution, consistent with embodiments of the invention, linear or other types of autoconvolution may be used, as well. Additionally, although the above equation uses certain constant values, these values may be different for different OFDM applications, such as Digital Audio Broadcasting, Digital Video Broadcasting, Integrated Services Digital Broadcasting, Wireless LAN (IEEE 802.11(a/g), HiperLAN/2, MMAC), Wireless MAN, and IEEE 802.20, or other OFDM applications, standards, and/or platforms. The above example corresponds to the IEEE 802.16(e) standard. Autoconvolving the portion of the OFDM complex valued sample stream may further include transforming the portion of the OFDM complex valued sample stream from time domain into frequency domain to generate a frequency domain portion of the OFDM complex valued sample stream. Furthermore, as part of this step, the frequency domain portion of the OFDM complex valued sample stream may be squared to generate a squared frequency domain portion of the OFDM complex valued sample stream. Next, the squared frequency domain portion of the OFDM complex valued sample stream may be subjected to an inverse transform to generate a time domain portion of the OFDM complex valued sample stream.

The next step may include determining a presence of a preamble in the OFDM complex valued sample stream if a peak is detected in the autoconvolved portion (step 24). As used herein, the term "peak" denotes a power value that exceeds a predetermined threshold. However, the term peak is not so limited, and may mean comparisons of other attributes, such as amplitude or energy, of an OFDM complex valued sample stream to respective threshold values. By way of example, the peak in the autoconvolved portion may be detected by computing power values in each sample of the autoconvolved portion and comparing each power value to a predetermined threshold.

Figure 3:
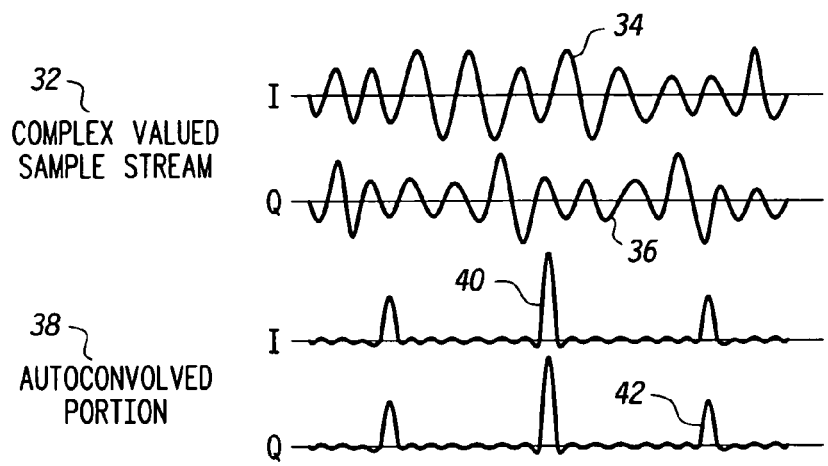
FIG. 3 is a time domain representation of a complex valued sample stream and an autoconvolved portion of the complex valued sample stream, consistent with one embodiment of the invention.

FIG. 3 is a time domain representation of an OFDM complex valued sample stream 32 and an autoconvolved portion 38 of the OFDM complex valued sample stream, consistent with one embodiment of the invention. OFDM complex valued sample stream may include an in-phase component 34 (identified as I) and a complex component 36 (identified as Q). Autoconvolved portion 38 may include peaks 40 and 42 in the autoconvolved IQ components.

Figure 4:
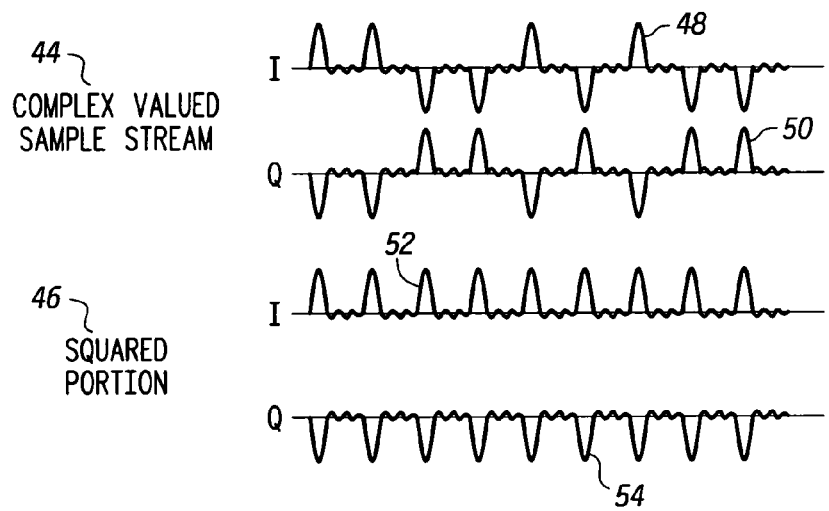
FIG. 4 is a frequency domain representation of a complex valued sample stream and a squared portion of the complex valued sample stream, consistent with one embodiment of the invention.
Figure 5:
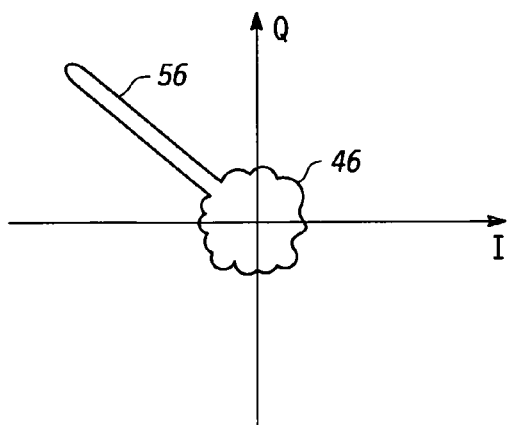
FIG. 5 is a diagram illustrating a peak in the frequency domain representation of a squared portion of the complex valued sample stream, consistent with one embodiment of the invention.

FIG. 4 is a frequency domain representation of an OFDM complex valued sample stream 44 and frequency domain representation of a squared portion 46 of the OFDM complex valued sample stream, consistent with one embodiment of the invention. FIG. 4 shows frequency representation of I and Q components (48 and 50) corresponding to the OFDM complex valued sample stream. The squared portion may include peaks 52 and 54 in the squared IQ components. FIG. 5 shows a peak 56 in the frequency domain representation of a squared portion 46 of the OFDM complex valued sample stream.

Figure 6:
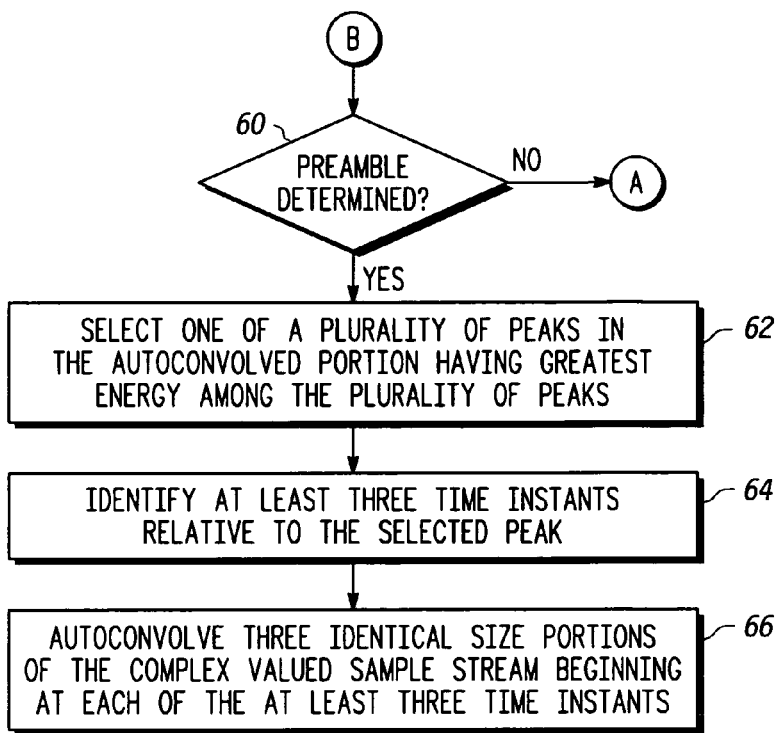
FIG. 6 is a partial flow chart of an exemplary method for determining a coarse timing of a complex valued sample stream, consistent with one embodiment of the invention.

FIG. 6 is a partial flow chart of an exemplary method for determining a coarse timing of a complex valued sample stream, consistent with one embodiment of the invention. As shown in FIG. 6, first OFDM engine 12 may determine whether a preamble has been determined (step 60). If no preamble is determined, then the OFDM engine 12 may repeat steps shown in the exemplary flow chart of FIG. 1. If the preamble is determined, then OFDM engine 12 may select one of a plurality of peaks in the autoconvolved portion having the greatest energy among the plurality of peaks (step 62).

Figure 7:
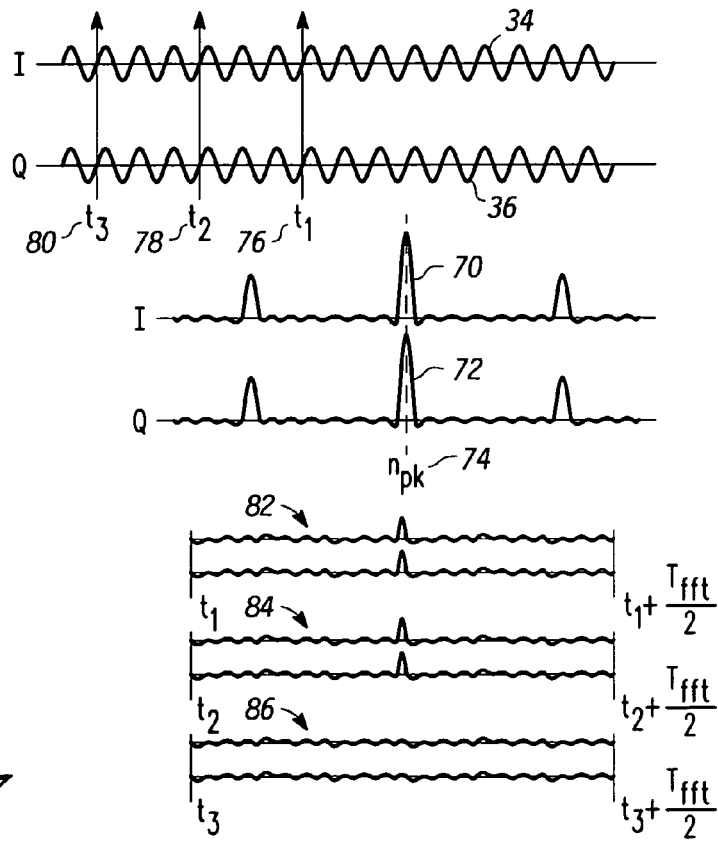
FIG. 7 shows exemplary autoconvolved identical size portions for three time instants.

Next, OFDM engine 12 may identify at least three time instants relative to the selected peak (step 64). By way of example, as shown in FIG. 7, the I component of the autoconvolved portion may have a peak 70 and the Q component of the autoconvolved portion may have a peak 72 (at the same time instant as peak 70). Peaks 70 and 72 may correspond to a particular sample index $n_{pk}$ of the autoconvolved portion. A first time instant $t_1$ 76 may be determined relative to the peaks 70 and 72 using the following equation:

$$t_1 = 1429n/f_s + (n_{pk}-1)/2f_s$$

where, n indexes the autoconvolved portions (thus n would increment for each autoconvolution performed); and $f_s$ is the sampling rate of the OFDM complex valued sample stream.

Next, a second time instant $t_2$ 78 may be determined by subtracting a value of $1/8f_2$ from the value of $t_1$, where $f_2$ is the sub-carrier spacing. A third time instant $t_3$ 80 may be determined by subtracting a value of $1/3f_2$ from the value of $t_1$, where $f_2$ is the sub-carrier spacing. Other values of $t_1$, $t_2$, and $t_3$ may be computed for OFDM systems that do not comply with IEEE 802.16(e) standard. Although the above exemplary equation uses certain number of time instants and certain constant values, these may be different for different OFDM applications, such as Digital Audio Broadcasting, Digital Video Broadcasting, Integrated Services Digital Broadcasting, Wireless LAN (IEEE 802.11(a/g), HiperLAN/2, MMAC), Wireless MAN, and IEEE 802.20, or other OFDM applications, standards, and/or platforms. The above example corresponds to the IEEE 802.16(e) standard. Although FIG. 7 shows three time instants, fewer or additional time instants may be determined.

Next, OFDM engine 12 may autoconvolve three identical size portions of the OFDM complex valued sample stream beginning at each of the at least three time instants (step 66). Exemplary values of the size of the autoconvolved three identical size portions include $T_{fft}$ and $T_{fft}/2$, where $T_{fft}$ is $1/f_2$. Using the exemplary equation below three identical size portions of the OFDM complex valued stream beginning at each of the at least three time instants may be autoconvolved.

Autoconvolved identical size portion =

$$\sum_{i=tiXfs}^{tiXfs+682} Sw(i)Sw(\mathrm{mod}((k-i), 2048))$$

where, $S_W$ is the portion of the OFDM complex valued sample stream;

i is the index of the portion of the OFDM complex valued sample stream;

$f_s$ is the sampling rate of the OFDM complex valued sample stream; and k is the index of the autoconvolved portion (thus k would increment for every sample in the resulting autoconvolved identical size portion).

Although the above equation uses certain constant values, these values may be different for different OFDM applications, such as Digital Audio Broadcasting, Digital Video Broadcasting, Integrated Services Digital Broadcasting, Wireless LAN (IEEE 802.11(a/g), HiperLAN/2, MMAC), Wireless MAN, and IEEE 802.20, or other OFDM applications, standards, and/or platforms. The above example corresponds to the IEEE 802.16(e) standard. Referring to FIG. 7 now, exemplary autoconvolved identical size portions 82, 84, and 86 for the three time instants $t_1$, $t_2$, and $t_3$ are shown.

Figure 8:
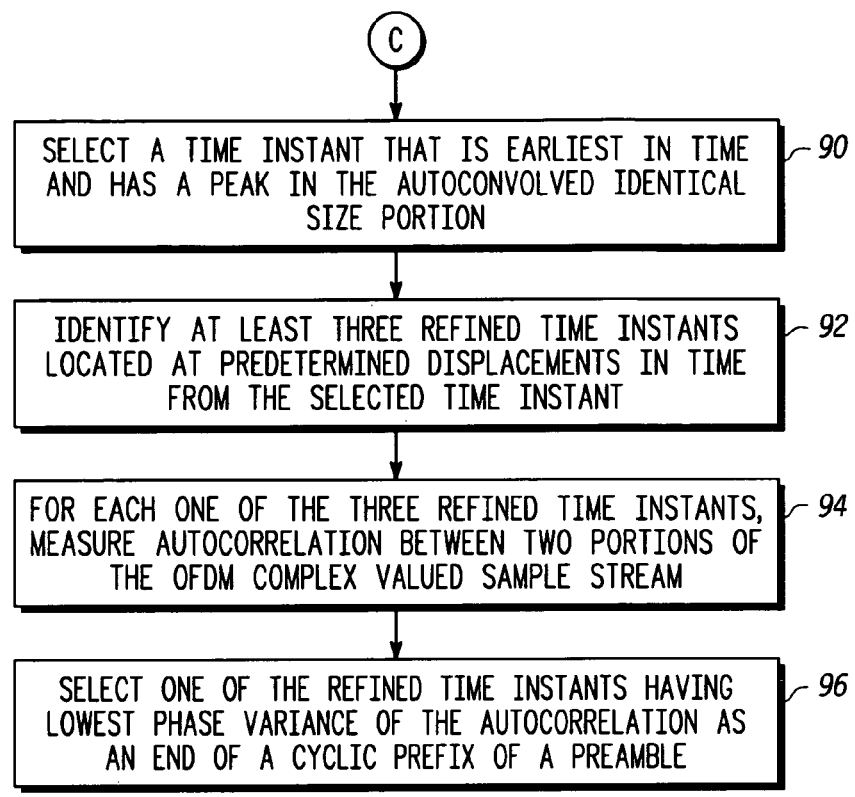
FIG. 8 is a partial flow chart of the exemplary method for determining a coarse timing of the complex valued sample stream, consistent with one embodiment of the invention.

FIG. 8 is a partial flow chart of the exemplary method for determining a coarse timing of the complex valued sample stream, consistent with one embodiment of the invention. As part of determining the coarse timing of the complex valued sample stream, OFDM engine 12 may select a time instant that is earliest in time and has a peak in the autoconvolved identical size portion (step 90). Thus, for example, OFDM engine 12 may select one of time instants $t_1$, $t_2$, and $t_3$, which satisfies two conditions: first it has a peak in the corresponding autoconvolved identical size portion and second that it is the earliest in time. Referring to FIG. 7, by way of example, $t_2$ may be selected, since it has a peak and is the earliest in time.

Next, OFDM engine 12 may identify at least three refined time instants located at predetermined displacements in time from the selected time instant (step 92). By way of example, a first refined time instant may be located at a displacement of $T_{fft}/3$ from the selected time instant (earlier in time than the selected time instant), the second refined time instant may be located at a displacement of $T_{fft}/3$ from the selected time instant (later in time than the selected time instant), and the third refined time instant may be located at a zero displacement from the selected time instant. As part of this step, additional refined time instants may be identified. For example, additional refined time instants may be located at displacements of $T_{fft}/6$, $T_{fft}/2$, and $2\,T_{fft}/3$ (both earlier in time and later in time, for example).

Figure 9:
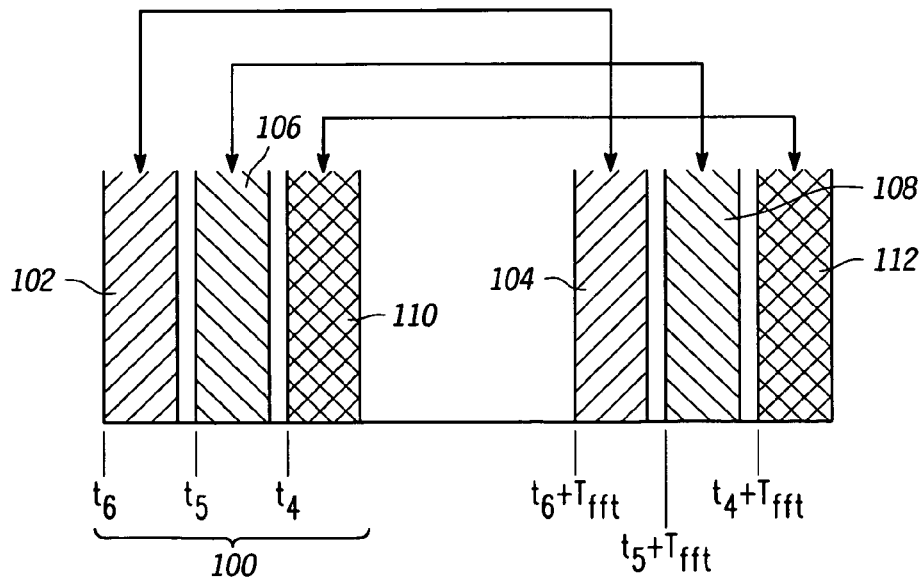
FIG. 9 shows exemplary autocorrelations between portions of the complex valued sample stream for three exemplary refined time instants.

Next, OFDM engine 12 may, for each one of the three refined time instants, measure autocorrelation between two portions of the OFDM complex valued sample stream (step 94). Referring to FIG. 9, the three refined time instants $t_4$, $t_5$, and $t_6$ 100 are shown. As part of this step, an autocorrelation between a portion 102 (starting at $t_6$) and a portion 104 (starting at $t_6+T_{fft}$) may be determined. In addition, an autocorrelation between a portion 106 (starting at $t_5$) and a portion 108 (starting at $t_5+T_{fft}$) may be determined. In addition, an autocorrelation between a portion 110 (starting at $t_4$) and a portion 112 (starting at $t_4+T_{fft}$) may be determined. By way of example, each one of these portions (102, 104, 106, 108, 110, and 112) may be $T_{fft}/8$ wide. For example, autocorrelation between the two relevant portions may be determined using the following equation:

$$R_{rr}(k, N_{fft}) = \sum_{\Delta=\frac{-T_{fft}fs}{8}+1}^{\frac{T_{fft}fs}{8}-1} \left(\frac{T_{fft}fs}{8} - \mathrm{abs}(\Delta)\right)$$

$$e^{-j2\pi \Delta k/N_{fft}} \sum_{n=\max(1,-\Delta+1)}^{\min(T_{fft}/8, T_{fft}/8-\Delta)} r(n) r*(n + \Delta + N_{fft})$$

where, k is a frequency index of the autocorrelation function;

$T_{fft}$ is $1/f_2$;

$f_s$ is the sampling rate of the OFDM complex valued sample stream;

$N_{fft}$ is equal to $T_{fft}*f_s$; and

? is the incremental delay relative to $N_{fft}$.

Although the above equation uses certain constant values, these values may be different for different OFDM applications, such as Digital Audio Broadcasting, Digital Video Broadcasting, Integrated Services Digital Broadcasting, Wireless LAN (IEEE 802.11(a/g), HiperLAN/2, MMAC), Wireless MAN, and IEEE 802.20, or other OFDM applications, standards, and/or platforms. The above example corresponds to the IEEE 802.16(e) standard.

Next, OFDM engine 12 may select one of the refined time instants having the lowest phase variance of the autocorrelation as an end of a cyclic prefix of a preamble (step 96). By way of example, as part of this step, a histogram of the phase of the previously computed autocorrelation may be generated. By way of example, the histogram may be generated using the following equation:

$$f(b(n))=\mathrm{hist}(\angle R_{rr}(k, Nfft))$$

Next, as part of this step, the phase variance of the autocorrelation may be computed. By way of example, the phase variance of the autocorrelation may be computed using the following equation:

$$\mathrm{var} = \frac{\sum b^2(n) f(b(n))}{\sum_n f(b(n))}$$

where f(b(n)) is the histogram of the angle of the autocorrelation; and b(n) are the bin centers of the histogram of the autocorrelation.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for generating a coarse timing for an orthogonal frequency division multiplexed (OFDM) complex valued sample stream, comprising:
   capturing, using a receiver, a portion of the OFDM complex valued sample stream;
   autoconvolving, using the receiver, the portion of the OFDM complex valued sample stream to generate an autoconvolved portion;
   determining, using the receiver, a presence of a preamble in the OFDM complex valued sample stream if a peak is detected in the autoconvolved portion;
   if the presence of the preamble is determined, selecting, using the receiver, one of a plurality of peaks in the autoconvolved portion having greatest energy among the plurality of peaks;
   identifying, using the receiver, at least three time instants relative to the selected one of the plurality of peaks;
   autoconvolving, using the receiver, at least three identical size portions of the OFDM complex valued sample stream beginning at each of the at least three time instants;
   selecting, using the receiver, a time instant out of the at least three time instants that is earliest in time and has a peak in the autoconvolved identical size portion;
   identifying, using the receiver, at least three refined time instants located at predetermined displacements in time from the selected time instant;
   for each one of the at least three refined time instants, measuring, using the receiver, autocorrelation between two portions of the OFDM complex valued sample stream; and
   selecting, using the receiver, one of the at least three refined time instants having lowest phase variance of the autocorrelation as an end of a cyclic prefix of a preamble.

2. The method of claim 1, wherein autoconvolving the portion of the OFDM complex valued sample stream comprises transforming the portion of the OFDM complex valued sample stream from time domain into frequency domain to generate a frequency domain portion of the OFDM complex valued sample stream.

3. The method of claim 2, wherein autoconvolving the portion of the OFDM complex valued sample stream further comprises squaring the frequency domain portion of the OFDM complex valued sample stream to generate a squared portion of the frequency domain portion of the OFDM complex valued sample stream.

4. The method of claim 3 further comprising applying an inverse transform to the squared portion of the frequency domain portion of the OFDM complex valued sample stream to generate a time domain portion of the OFDM complex valued sample stream.

5. A method for generating a coarse timing for an orthogonal frequency division multiplexed (OFDM) complex valued sample stream, comprising:
   capturing, using an OFDM engine of a receiver, a portion of the OFDM complex valued sample stream;
   autoconvolving, using the OFDM engine, the portion of the OFDM complex valued sample stream to generate an autoconvolved portion;
   determining, using the OFDM engine, a presence of a preamble in the OFDM complex valued sample stream, if a peak is detected in the autoconvolved portion;
   if the presence of the preamble is determined, selecting, using the OFDM engine, one of a plurality of peaks in the autoconvolved portion having greatest energy among the plurality of peaks;
   identifying, using the OFDM engine, at least three time instants relative to the selected one of the plurality of peaks;
   autoconvolving, using the OFDM engine, at least three identical size portions of the OFDM complex valued sample stream beginning at each of the at least three time instants;
   selecting, using the OFDM engine, a time instant out of the at least three time instants that is earliest in time and has a peak in the autoconvolved identical size portion;
   identifying, using the OFDM engine, at least three refined time instants located at predetermined displacements in time from the selected time instant;
   for each one of the at least three refined time instants, measuring, using the OFDM engine, autocorrelation between two portions of the OFDM complex valued sample stream; and
   selecting, using the OFDM engine, one of the at least three refined time instants having lowest phase variance of the autocorrelation as an end of a cyclic prefix of a preamble.

6. The method of claim 5, wherein autoconvolving the portion of the OFDM complex valued sample stream comprises transforming the portion of the OFDM complex valued sample stream from time domain into frequency domain to generate a frequency domain portion of the OFDM complex valued sample stream.

7. The method of claim 6, wherein autoconvolving the portion of the OFDM complex valued sample stream further comprises squaring the frequency domain portion of the OFDM complex valued sample stream to generate a squared portion of the frequency domain portion of the OFDM complex valued sample stream.

8. The method of claim 7 further comprising applying an inverse transform to the squared portion of the frequency domain portion of the OFDM complex valued sample stream to generate a time domain portion of the OFDM complex valued sample stream.

9. The method of claim 5, wherein identifying the at least three time instants relative to the selected one of the plurality of peaks further comprises identifying a first time instant relative to a peak having a sample index $n_{pk}$, using an equation:

$$t_1 = 1429 n/f_s + (n_{pk}-1)/2f_s,$$

wherein, $t_1$ is the first time instant, n indexes the autoconvolved portion, and $f_s$ is the sampling rate of the OFDM complex valued sample stream.

10. The method of claim 9, wherein identifying the at least three time instants relative to the selected one of the plurality of peaks further comprises identifying a second time instant ($t_2$) by subtracting a value of ⅙$f_?$ from the value of the first time instant ($t_1$), wherein $f_?$ is a sub-carrier spacing for the OFDM sample stream.

11. The method of claim 9, wherein identifying the at least three time instants relative to the selected one of the plurality of peaks further comprises identifying a third time instant ($t_3$) by subtracting a value of ⅓$f_?$ from the value of the first time instant ($t_1$), wherein $f_?$ is a sub-carrier spacing for the OFDM sample stream.

12. An orthogonal frequency division multiplexing (OFDM) receiver comprising:
an OFDM engine, wherein the OFDM engine is configured to:
capture a portion of an OFDM complex valued sample stream;
autoconvolve the portion of the OFDM complex valued sample stream to generate an autoconvolved portion;
determine a presence of a preamble in the OFDM complex valued sample stream, if a peak is detected in the autoconvolved portion;
if the presence of the preamble is determined, select one of a plurality of peaks in the autoconvolved portion having greatest energy among the plurality of peaks;
identify at least three time instants relative to the selected one of the plurality of peaks;
autoconvolve at least three identical size portions of the OFDM complex valued sample stream beginning at each of the at least three time instants;
select a time instant out of the at least three time instants that is earliest in time and has a peak in the autoconvolved identical size portion;
identify at least three refined time instants located at predetermined displacements in time from the selected time instant;
for each one of the at least three refined time instants, measure autocorrelation between two portions of the OFDM complex valued sample stream; and
select one of the at least three refined time instants having lowest phase variance of the autocorrelation as an end of a cyclic prefix of a preamble.

13. The OFDM receiver of claim 12, wherein the OFDM engine is further configured to transform the portion of the OFDM complex valued sample stream from time domain into frequency domain to generate a frequency domain portion of the OFDM complex valued sample stream.

14. The OFDM receiver of claim 13, wherein the OFDM engine is further configured to square the frequency domain portion of the OFDM complex valued sample stream to generate a squared portion of the frequency domain portion of the OFDM complex valued sample stream.

15. The OFDM receiver of claim 14, wherein the OFDM engine is further configured to apply an inverse transform to the squared portion of the frequency domain portion of the OFDM complex valued sample stream to generate a time domain portion of the OFDM complex valued sample stream.

16. A system for generating a coarse timing for an orthogonal frequency division multiplexed (OFDM) complex valued sample stream, comprising:

means for capturing a portion of the OFDM complex valued sample stream;
means for autoconvolving the portion of the OFDM complex valued sample stream to generate an autoconvolved portion;
means for determining a presence of a preamble in the OFDM complex valued sample stream if a peak is detected in the autoconvolved portion;
means for, if the presence of the preamble is determined, selecting one of a plurality of peaks in the autoconvolved portion having greatest energy among the plurality of peaks;
means for identifying at least three time instants relative to the selected one of the plurality of peaks;
means for autoconvolving at least three identical size portions of the OFDM complex valued sample stream beginning at each of the at least three time instants;
means for selecting a time instant out of the at least three time instants that is earliest in time and has a peak in the autoconvolved identical size portion;
means for identifying at least three refined time instants located at predetermined displacements in time from the selected time instant;
means for, for each one of the at least three refined time instants, measuring autocorrelation between two portions of the OFDM complex valued sample stream; and
means for selecting one of the at least three refined time instants having lowest phase variance of the autocorrelation as an end of a cyclic prefix of a preamble.

17. The system of claim 16, wherein the means for autoconvolving the portion of the OFDM complex valued sample stream comprises means for transforming the portion of the OFDM complex valued sample stream from time domain into frequency domain to generate a frequency domain portion of the OFDM complex valued sample stream.

18. The system of claim 17, wherein the means for autoconvolving the portion of the OFDM complex valued sample stream further comprises means for squaring the frequency domain portion of the OFDM complex valued sample stream to generate a squared portion of the frequency domain portion of th9 OFDM complex valued sample stream.

19. The system of claim 18 further comprising means for applying an inverse transform to the squared portion of the frequency domain portion of the OFDM complex valued sample stream to generate a time domain portion of the OFDM complex valued sample stream.

20. The system of claim 16, wherein the means for identifying the at least three time instants relative to the selected one of the plurality of peaks further comprises means for identifying a first time instant relative to a peak having a sample index $n_{pk}$, using an equation:

$$t_1 = 1429 n/f_s + (n_{pk}-1)/2f_s,$$

wherein, $t_1$ is the first time instant, n indexes the autoconvolved portion, and $f_s$ is the sampling rate of the OFDM complex valued sample stream.

* * * * *